United States Patent
Uchiyama et al.

(10) Patent No.: US 9,036,551 B2
(45) Date of Patent: May 19, 2015

(54) BASE STATION AND METHOD TO ACQUIRE CAPABILITY OF MOBILE APPARATUS IN MOBILE COMMUNICATION SYSTEM

(75) Inventors: Tadashi Uchiyama, Miura (JP);
Kazunori Obata, Yokosuka (JP); Seigo Harano, Yokohama (JP); Shogo Yabuki, Yokosuka (JP); Minami Ishii, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 330 days.

(21) Appl. No.: 13/636,033

(22) PCT Filed: Mar. 29, 2011

(86) PCT No.: PCT/JP2011/057897
§ 371 (c)(1),
(2), (4) Date: Sep. 19, 2012

(87) PCT Pub. No.: WO2011/125675
PCT Pub. Date: Oct. 13, 2011

(65) Prior Publication Data
US 2013/0010701 A1    Jan. 10, 2013

(30) Foreign Application Priority Data

Apr. 5, 2010   (JP) ................. 2010-087104

(51) Int. Cl.
*H04W 4/00*    (2009.01)
*H04W 8/22*    (2009.01)
(Continued)

(52) U.S. Cl.
CPC ............ *H04W 8/22* (2013.01); *H04W 48/16* (2013.01); *H04W 88/06* (2013.01); *H04W 88/08* (2013.01)

(58) Field of Classification Search
CPC ..... H04W 84/12; H04W 84/18; H04W 88/08; H04W 88/06; H04W 80/04; H04W 36/18; H04W 36/0011; H04L 65/00; H04L 45/02

USPC ............ 370/310, 310.2, 313, 315, 328, 331, 370/332, 439, 338
See application file for complete search history.

(56) References Cited

U.S. PATENT DOCUMENTS

| | | | |
|---|---|---|---|
| 2009/0170426 A1* | 7/2009 | Jung et al. | 455/7 |
| 2010/0159919 A1* | 6/2010 | Wu | 455/424 |
| 2011/0256855 A1* | 10/2011 | Wang | 455/418 |

FOREIGN PATENT DOCUMENTS

| | | |
|---|---|---|
| CN | 1997206 A | 7/2007 |
| CN | 101083839 A | 12/2007 |
| CN | 101640879 A | 2/2010 |
| WO | 2010012176 A1 | 2/2010 |

OTHER PUBLICATIONS

International Search Report w/translation from PCT/JP2011/057897 mailed Apr. 26, 2011 (4 pages).

(Continued)

*Primary Examiner* — Anh Ngoc Nguyen
(74) *Attorney, Agent, or Firm* — Osha Liang LLP

(57) ABSTRACT

A base station includes a radio communication unit (82, 85) configured to wirelessly communicate with a mobile apparatus capable of communicating in both a first mobile communication system and a second mobile communication system and a network communication unit (83, 84) configured to communicate with a switching station in the first mobile communication system, and if a line setup instruction signal (Initial Context Setup Request) received at the network communication unit from the switching station is not due to initial access to the switching station by the mobile apparatus, the radio communication unit receives mobile apparatus capability information in the second mobile communication system (UE-UTRA-Capability) from the mobile apparatus after transmitting a line setup response signal (Initial Context Setup Response) to the switching station.

12 Claims, 8 Drawing Sheets

(51) Int. Cl.
  *H04W 48/16* (2009.01)
  *H04W 88/06* (2009.01)
  *H04W 88/08* (2009.01)

(56) References Cited

OTHER PUBLICATIONS

Written Opinion from PCT/JP2011/057897 mailed Apr. 26, 2011 (3 pages).
3GPP TS 36.331 V8.8.0; "3rd Generation Partnership Project; Technical Specification Group Radio Access Network; Evolved Universal Terrestrial Radio Access (E-UTRA) Radio Resource Control (RRC); Protocol specification (Release 8)"; Dec. 2009 (211 pages).
TSG-RAN Working Group 2 Meeting #66bis, R2-094087; "Report of 3GPP TSG RAN WG2 meeting #66, San Francisco, USA, May 4-8, 2009"; Los Angeles, USA; Jun. 29-Jul. 3, 2009 (151 pages).
Office Action in the counterpart Chinese Patent Application No. 201180022881.1, issued Oct. 23, 2014 (15 pages).
International Search Report w/translation from PCT/CN2009/072061, mailed Sep. 10, 2009 (6 pages).

* cited by examiner

BASE STATION AND METHOD TO ACQUIRE CAPABILITY OF MOBILE APPARATUS IN MOBILE COMMUNICATION SYSTEM

TECHNICAL FIELD

The disclosure relates to a base station and a method in a mobile communication system.

BACKGROUND ART

In this technical field, schemes for current and future mobile communication systems have been being developed by Third Generation Partnership Project (3GPP). Particularly, the schemes include Evolved Universal Terrestrial Radio Access (E-UTRA) or Evolved Universal Terrestrial Radio Access Network (E-UTRAN) as a successor of a Wideband Code Division Multiplexing Access (WCDMA) based UTRA or UTRAN system. The E-UTRA or E-UTRAN scheme may be also referred to as a Long Term Evolution (LTE) scheme.

FIG. 1 illustrates an exemplary sequence in an E-UTRA based mobile communication system. At step S1, a RRC connection is configured between a mobile apparatus (UE) and a base station (eNB) (RRC connection setup). At step S2, the base station eNB (enhanced Node B) sends a switching station (Mobility Management Entity: MME) a signal referred to as "Initial UE Message". This signal is sent due to initial access to the switching station MME by the mobile apparatus. Accordingly, the switching station MME has no capability information on the mobile apparatus UE at this timing. The capability information or mobile apparatus capability information includes category information of the mobile apparatus, information on bands available for the mobile apparatus in communication, security information and so on and is used for control in the base station eNB and the switching station MME. At step S3, the switching station MME sends the base station eNB a signal referred to as "Initial Context Setup Request". When the base station eNB requests the mobile apparatus capability information from the mobile apparatus UE at step S4, the base station eNB receives the mobile apparatus capability information from the mobile apparatus UE and stores the received mobile apparatus capability information at step S5. At step S6, the switching station MME receives the mobile apparatus capability information (UE-EUTRA-Capability) from the base station eNB and stores the received mobile apparatus capability information. At step S7, ciphering and RRC connection reconfiguration are performed, and at step S8, the base station eNB sends the switching station MME a line setup completion signal referred to as "Initial Context Setup Response".

FIG. 2 also illustrates an exemplary sequence in an E-UTRA based mobile communication system, although it illustrates subsequent accesses to the switching station MME. The base station eNB stores information regarding the mobile apparatus UE (for example, the above-stated mobile apparatus capability information) after the mobile apparatus UE starts a session and upon completion of the session, discards the information regarding the mobile apparatus UE. On the other hand, the switching station MME stores the information regarding the mobile apparatus UE even after completion of the session for the mobile apparatus UE. When a location registration area or a tracking area of the mobile apparatus UE changes, and accordingly the switching station MME for managing the mobile apparatus UE also changes, the switching station MME discards the information regarding the mobile apparatus UE. As a result, as long as the location registration area of the mobile apparatus UE does not change, the switching station MME possesses the information regarding the mobile apparatus UE (for example, mobile apparatus capability information) in subsequent accesses to the switching station MME. At step S11, the switching station MME can indicate the mobile apparatus capability information (UE-EUTRA-Capability) regarding the mobile apparatus UE to the base station eNB in transmissions of signals referred to as "Initial Context Setup Request". In this case, the base station eNB does not have to request the mobile apparatus capability information regarding the mobile apparatus UE again.

3GPP TS36.331, Sec. 5.6.3 describes some sequences for the mobile apparatus capability information. 3GPP TS36.331, Sec. 6.3.6 describes contents of the mobile apparatus capability information.

DISCLOSURE OF INVENTION

Problem to be Solved by the Invention

Meanwhile, an E-UTRA based system has backward compatibility and allows a mobile apparatus to perform handover to a UTRA based system, for example. Thus, the above mobile apparatus capability information (UE-EUTRA-Capability) includes not only information necessary for communication control in the E-UTRA based system but also a portion of information regarding the UTRA based system. For example, the mobile apparatus capability information for the EUTRA based system may include information indicating which bands in the UTRA based system are available to the mobile apparatus UE for communication. Based on the mobile apparatus capability information, the mobile apparatus in the EUTRA based system can theoretically migrate to the UTRA based system. However, all control information items for use in the UTRA based system are required for actual communication in the UTRA based system. In other words, the mobile apparatus capability information (UE-UTRA-Capability) for the UTRA based system is also specified, and all items of the mobile apparatus capability information are required for communication in the UTRA based system. The mobile apparatus capability information for the UTRA based system (UE-UTRA-Capability) also includes types of information items similar to the EUTRA based system. For example, information on bands available to the mobile apparatus UE for communication may be included in both the mobile apparatus capability information in the EUTRA based mobile communication system and the mobile apparatus capability information in the UTRA based mobile communication system. However, the mobile apparatus capability information UE-UTRA-Capability includes control information items specified in the EUTRA based system. For example, such a control information item may be an information item indicative of types of processing capabilities available in the UTRA based system. If all of the information items are not provided, the mobile apparatus UE could not establish appropriate communication after migration to the UTRA based system. Accordingly, the base station eNB has to obtain all items of the mobile apparatus capability information for the UTRA based system (UE-UTRA-Capability) before the mobile apparatus UE performs handover to the UTRA based system. 3GPP TS 36. 331, Sec. 5.6.3 and 3GPP TS 36. 331, Sec. 6.3.6 do not define timings of obtaining the mobile apparatus capability information in the specification.

As stated above, the switching station MME possesses the EUTRA version of mobile apparatus capability information (UE-EUTRA-Capability) regardless of whether a session of the mobile apparatus UE has been finished. On the other hand, the switching station MME does not store the UTRA version of mobile apparatus capability information (UE-UTRA-Capability) due to security reasons. (See Report of 3GPP TSG RAN WG2 meeting #66 held in San Francisco, USA May 4-8, 2009 ("=>We do not upload UMTS capabilities to the MME" and "=>Before handover to UMTS, eNB always has to retrieve UMTS capabilities from Uhttp://www.3gpp.org/ftp/tsg_ran/WG2_RL2/TSGR2__66/Report/E" in "4.1.1 Inter-RAT mobility UMTS<->LTE") and the internet http://www.3gpp.org/ftp/tsg_ran/WG2RL2/TSGR2__66/Report/.) Accordingly, the base station eNB cannot expect to obtain the mobile apparatus capability information UE-UTRA-Capability from the switching station MME and has to obtain it from the mobile apparatus UE at any timing.

As one method for obtaining the UTRA version of mobile apparatus capability information UE-UTRA-Capability, it is conceived that the base station eNB may obtain the UTRA version of mobile apparatus capability information immediately after receiving "Initial Context Setup Request" as illustrated in FIGS. 1-2. This means that the base station eNB performs operations corresponding to steps S4 and S5 in FIG. 1 even after receiving "Initial Context Setup Request" at step S3 in FIG. 1 as well as step S11 in FIG. 2. Such operations are preferred from the viewpoint of prompt acquisition of the mobile apparatus capability information #UE-UTRA-Capability) by the base station eNB. However, the operations corresponding to steps S4 and S5 in FIG. 1 must be always performed also after step S11 in FIG. 2, which may cause delay of transmission timings of a line setup completion signal (Initial Context Setup Response) from the base station eNB to the switching station MME. The user could not experience initiation of communication before transmission of the line setup completion signal. If the transmission timing is delayed, the user would experience a longer waiting time.

As another method for obtaining the UTRA version of mobile apparatus capability information (UE-UTRA-Capability), it is conceived that when the base station eNB (source base station) determines that the mobile apparatus should be handed over, the base station eNB may obtain the mobile apparatus capability information at that timing. This is advantageous in that the mobile apparatus capability information is not obtained until the mobile apparatus capability information (UE-UTRA-Capability) is truly needed. However, if the operations corresponding to steps S4 and S5 in FIG. 1 are performed after determining that the mobile apparatus UE should be handed over, the transmission timing of a handover command to the mobile apparatus UE may be accordingly delayed. If the handover operation is prolonged by at least a period corresponding to steps S4 and S5 in FIG. 1, there may arise a risk of reduction in a handover success rate in the worst case.

One object of the present invention, is to enable a base station communicating with a mobile apparatus in a first mobile communication system (E-UTRA) to obtain mobile apparatus capability information on the mobile apparatus for a second mobile communication system (UTRA) at an appropriate timing.

Means for Solving the Problem

One aspect of the present invention relates to a base station including a radio communication unit configured to wirelessly communicate with a mobile apparatus capable of communicating in both a first mobile communication system and a second mobile communication system and a network communication unit configured to communicate with a switching station in the first mobile communication system, wherein if a line setup instruction signal received at the network communication unit from the switching station is not due to initial access to the switching station by the mobile apparatus, the radio communication unit receives mobile apparatus capability information in the second mobile communication system from the mobile apparatus.

Advantage of the Invention

According to the present invention, it is possible for a base station communicating with a mobile apparatus in a first mobile communication system (E-UTRA) to obtain mobile apparatus capability information on the mobile apparatus for a second mobile communication system (UTRA) at an appropriate timing.

EMBODIMENTS OF THE INVENTION

Figure 1:
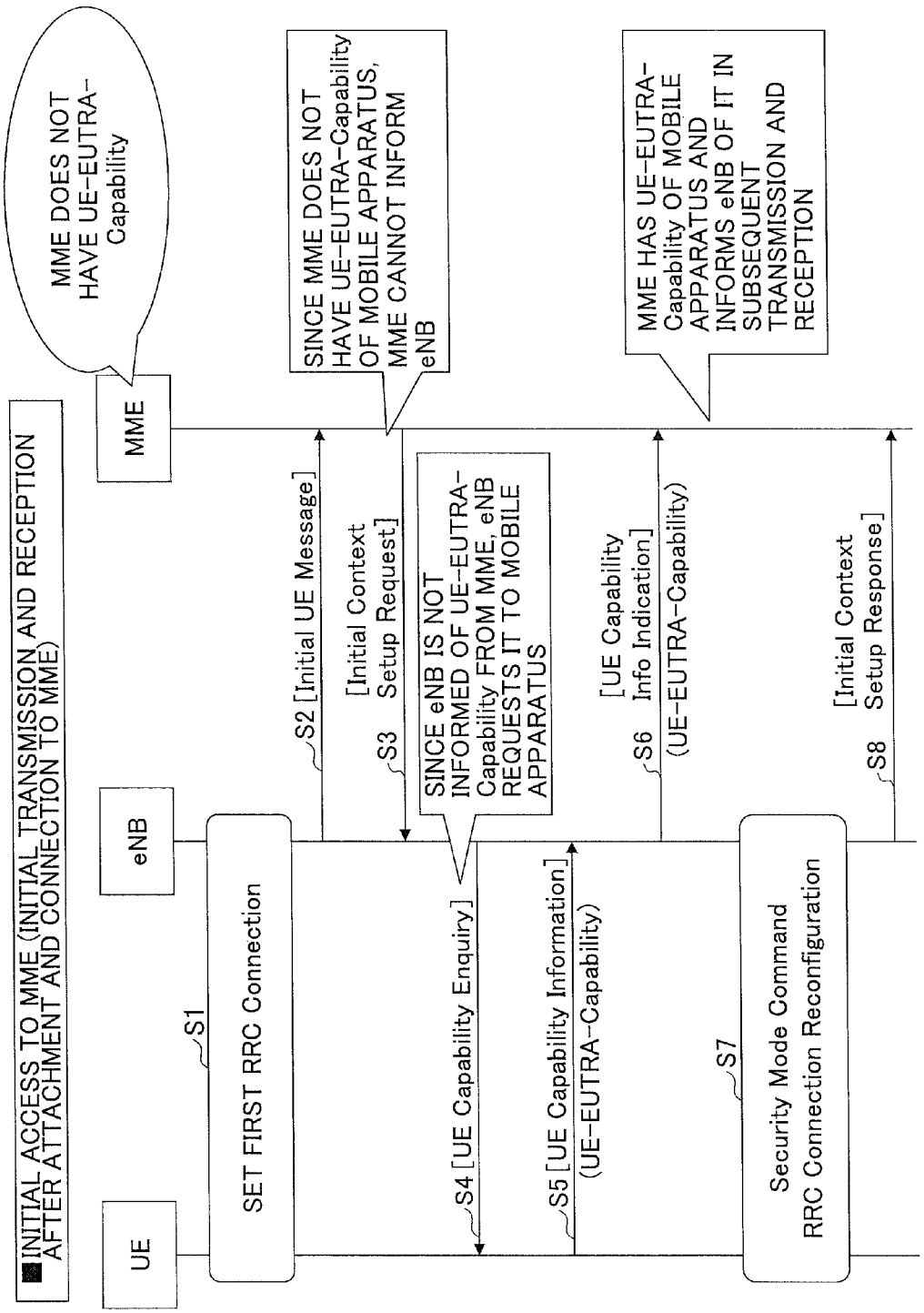
FIG. 1 is a diagram for illustrating an exemplary sequence in an E-UTRA based mobile communication system.

Embodiments of the present invention are described by way of examples as set forth with reference to the drawings. Throughout all the drawings for illustrating the embodiments, the same reference symbols are used for the same functions, and descriptions thereof are not repeated.

According to a first aspect of the present disclosure, a base station includes a radio communication unit configured to wirelessly communicate with a mobile apparatus (UE) capable of communicating in both a first mobile communication system and a second mobile communication system and a network communication unit configured to communicate with a switching station (MME) in the first mobile communication system, wherein if a line setup instruction signal (Initial Context Setup Request) received at the network communication unit from the switching station (MME) is not due to initial access to the switching station (MME) by the mobile apparatus (UE), the radio communication unit receives mobile apparatus capability information in the second mobile communication system from the mobile apparatus (UE).

According to this aspect, since the line setup response signal is transmitted promptly, it is possible to shorten user's waiting time until initiation of transmission and reception or handover instruction. Furthermore, the base station communicating with the mobile apparatus in the first mobile communication system can obtain the mobile apparatus capability information on the mobile apparatus in the second mobile communication system at an appropriate timing.

In one embodiment, if the line setup instruction signal received at the network communication unit from the switching station is due to the initial access to the switching station by the mobile apparatus, the radio communication unit may receive the respective mobile apparatus capability information in the first and second mobile communication systems from the mobile apparatus. In the initial access, since the switching station MME does not have the mobile apparatus capability information, the base station has to obtain UE-EUTRA-Capability. By obtaining UE-UTRA-Capability as well at this time, more efficient information acquisition can be achieved.

In one embodiment, the network communication unit may send the switching station a line setup request signal after configuring a RRC connection between the base station and the mobile apparatus.

In one embodiment, the network communication unit may send the switching station the mobile apparatus capability information in the first mobile communication system.

In one embodiment, the mobile apparatus capability information in the second mobile communication system may include at least information on processing capability of the mobile apparatus, information on a band available to the mobile apparatus for communication and security information.

In one embodiment, the first mobile communication system may be an E-UTRA based mobile communication system, and the second mobile communication system may be a UTRA based mobile communication system.

According to a second aspect of the present disclosure, a method in a base station including a radio communication unit configured to wirelessly communicate with a mobile apparatus capable of communicating in both a first mobile communication system and a second mobile communication system and a network communication unit configured to communicate with a switching station in the first mobile communication system includes, if a line setup instruction signal received at the network communication unit from the switching station is not due to initial access to the switching station by the mobile apparatus, the radio communication unit receiving mobile apparatus capability information in the second mobile communication system from the mobile apparatus.

According to this aspect, since the line setup response signal is transmitted promptly, it is possible to shorten user's waiting time until initiation of transmission and reception or handover instruction. Furthermore, the base station communicating with the mobile apparatus in the first mobile communication system can obtain the mobile apparatus capability information on the mobile apparatus in the second mobile communication system at an appropriate timing.

In one embodiment, if the line setup instruction signal received at the network communication unit from the switching station is due to the initial access to the switching station by the mobile apparatus, the radio communication unit may receive the respective mobile apparatus capability information in the first and second mobile communication systems from the mobile apparatus. In the initial access, since the switching station MME does not have the mobile apparatus capability information, the base station has to obtain UE-EUTRA-Capability. By obtaining UE-UTRA-Capability as well at this time, more efficient information acquisition can be achieved.

In one embodiment, the network communication unit may send the switching station a line setup request signal after configuring a RRC connection between the base station and the mobile apparatus.

In one embodiment, the network communication unit may send the switching station the mobile apparatus capability information in the first mobile communication system.

In one embodiment, the mobile apparatus capability information in the second mobile communication system may include at least information on processing capability of the mobile apparatus, information on a band available to the mobile apparatus for communication and security information.

In one embodiment, the first mobile communication system may be an E-UTRA based mobile communication system, and the second mobile communication system may be a UTRA based mobile communication system.

Embodiments of the invention are disclosed below. In the embodiments, a first mobile communication system is geographically overlapped with a second mobile communication system at least partially, and a mobile apparatus UE can be handed over from one of the systems to the other. The first mobile communication system is an E-UTRA based system. The second mobile communication system is a UTRA based system. However, systems to which the present embodiments are applied are not limited to the E-UTRA based system and the UTRA based system. The systems may be other systems. For example, the present embodiments can be applied to a GERAN (GSM) based system, fourth generation mobile communication systems and so on.

The mobile apparatus UE is user equipment that can communicate in both the first and second mobile communication systems. The user equipment may be a cellular phone, an information terminal, a PDA (Personal Digital Assistant), a mobile personal computer and so on.

The base station eNB at least performs operations in the first mobile communication system (E-UTRA). The base station may be referred to as an access point AP. The base station eNB may performs operations in the second mobile communication system (UTRA) as well as those in the first mobile communication system. The operations of the base station eNB in the first mobile communication system include radio resource management, IP header compression and ciphering, routing of U-plane data, scheduling of paging messages or broadcast information and so on.

The switching station MME is coupled to the base station eNB via a S1 interface. The switching station is a Mobility Management Entity (MME) for managing mobility of the mobile apparatus. Specifically, the switching station MME performs operations such as mobility management among 3GPP access networks, management of a tracking area (location registration area) list, selection of a gateway (GW) and a serving gateway (GW) of a packet data network (PDN), selection of MME in handover, roaming, authentication and bearer management.

Figure 3:
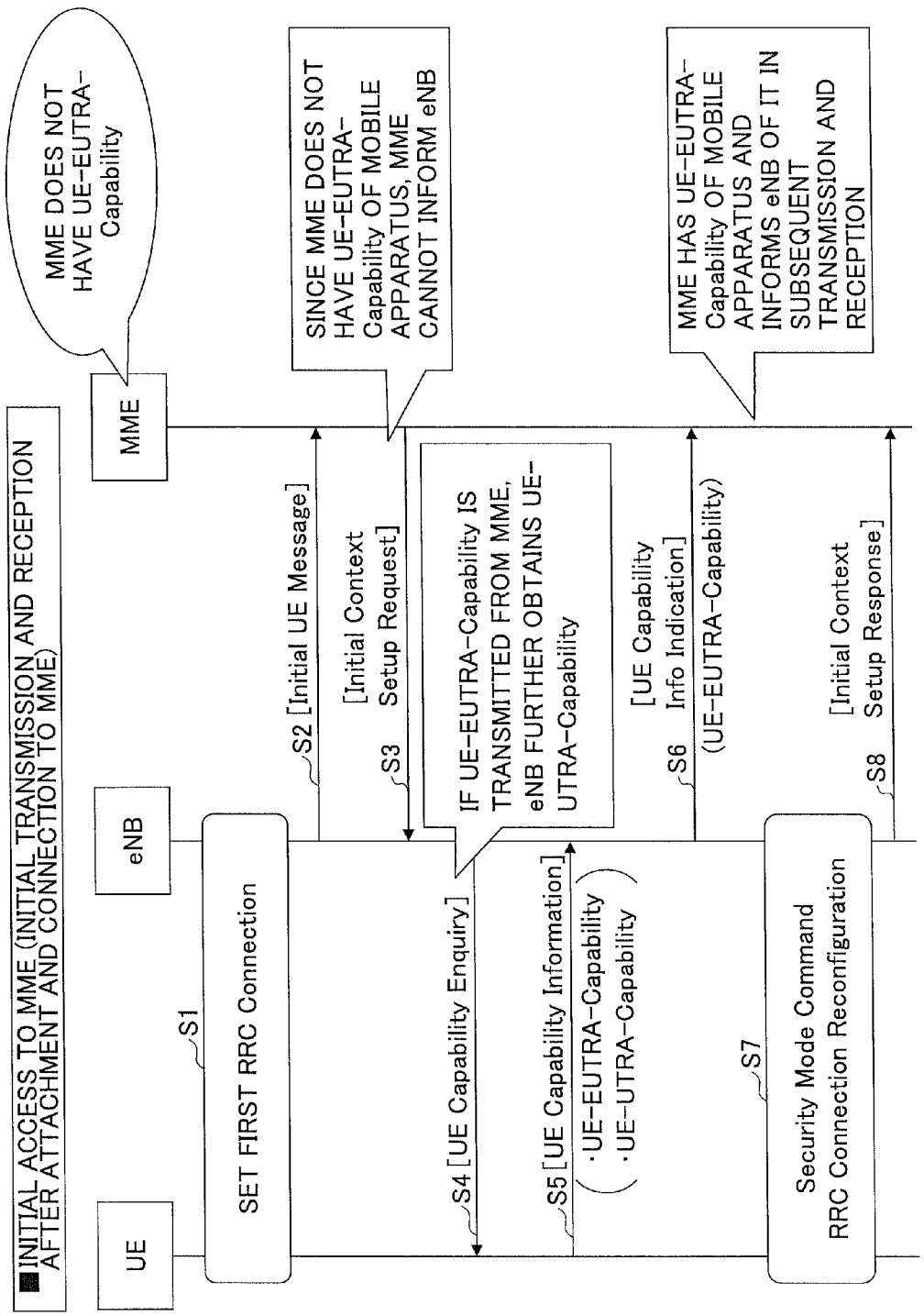
FIG. 3 is a diagram for illustrating an exemplary sequence according to the present embodiment for initial access to a switching station MME by a mobile apparatus UE.

FIG. 3 illustrates an exemplary sequence according to this embodiment in a case of initial access to a switching station MME by a mobile apparatus UE.

At step S1, a RRC connection is configured between the mobile apparatus UE and the base station eNB (RRC connection configuration). The configuration is made when the mobile apparatus UE initiates communication or when the mobile apparatus UE under idle mode receives a paging indicative of incoming calling.

At step S2, the base station eNB sends the switching station MME an "Initial UE Message" as a "line setup request signal". In the illustrated example, the line setup request signal is due to initial access to the switching station MME by the mobile apparatus UE. Accordingly, the switching station MME has no capability information of the mobile apparatus UE (UE-EUTRA-Capability) at this timing. The capability information or mobile apparatus capability information includes category information of the mobile apparatus, information on a band available to the mobile apparatus for communication, security information and so on. The mobile apparatus capability information is used for control in the base station eNB and the switching station MME.

At step S3, the switching station MME sends the base station eNB an "Initial Context Setup Request" as a "line setup instruction signal". Since the switching station MME has no mobile apparatus capability information for the mobile apparatus UE (UE-SUTRA-Capability), the switching station MME fails to indicate it to the base station eNB.

At step S4, the base station eNB requests the mobile apparatus UE to provide not only the mobile apparatus capability information in the EUTRA based system (UE-EUTRA-Capability) but also the mobile apparatus capability information in the UTRA based system (UE-UTRA-Capability).

At step S5, the base station eNB receives the mobile apparatus capability information in the EUTRA based system (UE-EUTRA-Capability) and the mobile apparatus capability information in the UTRA based system (UE-UTRA-Capability) from the mobile apparatus UE and stores them. This differs from conventional methods where the mobile apparatus capability information UE-UTRA-Capability is not transmitted to the base station eNB at step S5.

At step S6, the base station eNB sends the switching station MME the mobile apparatus capability information (UE-EUTRA-Capability). The switching station MME receives and stores the mobile apparatus capability information. In this case, it is noted that the switching station MME receives and stores the mobile apparatus capability information UE-EUTRA-Capability but does not receive nor store the mobile apparatus capability information UE-UTRA-Capability.

At step S7, ciphering and RRC connection reconfiguration are performed. In this case, the base station eNB may use the mobile apparatus capability information UE-EUTRA-Capability as needed.

At step S8, the base station eNB sends the switching station MME an "Initial Context Setup Response" as a "line setup response signal". The line setup response signal is also a line setup completion signal to indicate completion of line configuration. Subsequently, the user can initiate communication such as voice communication, Internet viewing, information downloading, email transmission and reception and so on.

In the above description, the mobile apparatus capability information UE-EUTRA-Capability and the mobile apparatus capability information UE-UTRA-Capability are separately requested at step S4, and they are transmitted to the base station eNB at step S5. However, the request at step S4 may be the same as the conventional one at step S4 in FIG. 1. This is because both versions of the mobile apparatus capability information can be transmitted to only the base station eNB at step S5. Even in the case where the request at step S4 is the same as a conventional one, the mobile apparatus UE knows that the mobile apparatus UE has initially accessed the switching station MME and accordingly knows that the mobile apparatus UE has to transmit both of the versions of the mobile apparatus capability information at step S5. Also, the mobile apparatus capability information UE-EUTRA-Capability and UE-UTRA-Capability may be simultaneously transmitted, sequentially transmitted or separately transmitted. This is because both of the versions of the mobile apparatus capability information only have to arrive at the base station eNB in reply to step S4.

Figure 4:
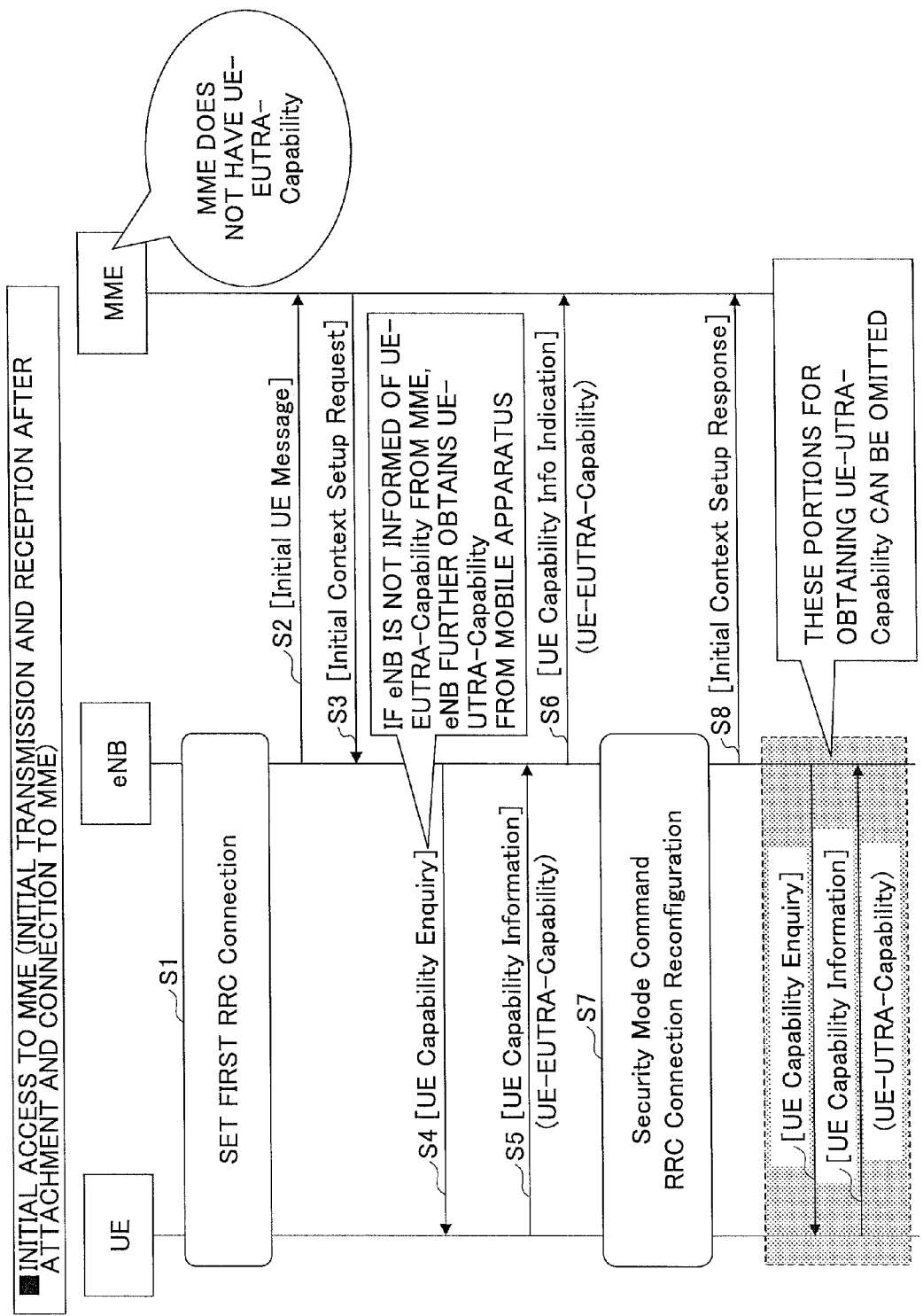
FIG. 4 is a diagram for illustrating an effect of the present embodiment.

According to the exemplary operations illustrated in FIG. 3, when the mobile apparatus UE sends the base station eNB the mobile apparatus capability information UE-EUTRA-Capability, the mobile apparatus UE also sends the mobile apparatus capability information UE-UTRA-Capability. As a result, it is possible to send the base station eNB the necessary mobile apparatus capability information promptly. If the mobile apparatus UE has not sent the base station eNB the mobile apparatus capability information UE-UTRA-Capability at step S5 in FIG. 3, the mobile apparatus UE would have to send the base station eNB the mobile apparatus capability information UE-UTRA-Capability at any different timing. For example, as illustrated in dashed lines in FIG. 4, the mobile apparatus capability information UE-UTRA-Capability has to be sent to the base station eNB at a different timing. However, in addition to steps S4 and S5, it is not preferable to perform the additional operations as illustrated in the dashed lines from the viewpoint of efficient utilization of radio resources and efficient information acquisition.

Figure 5:
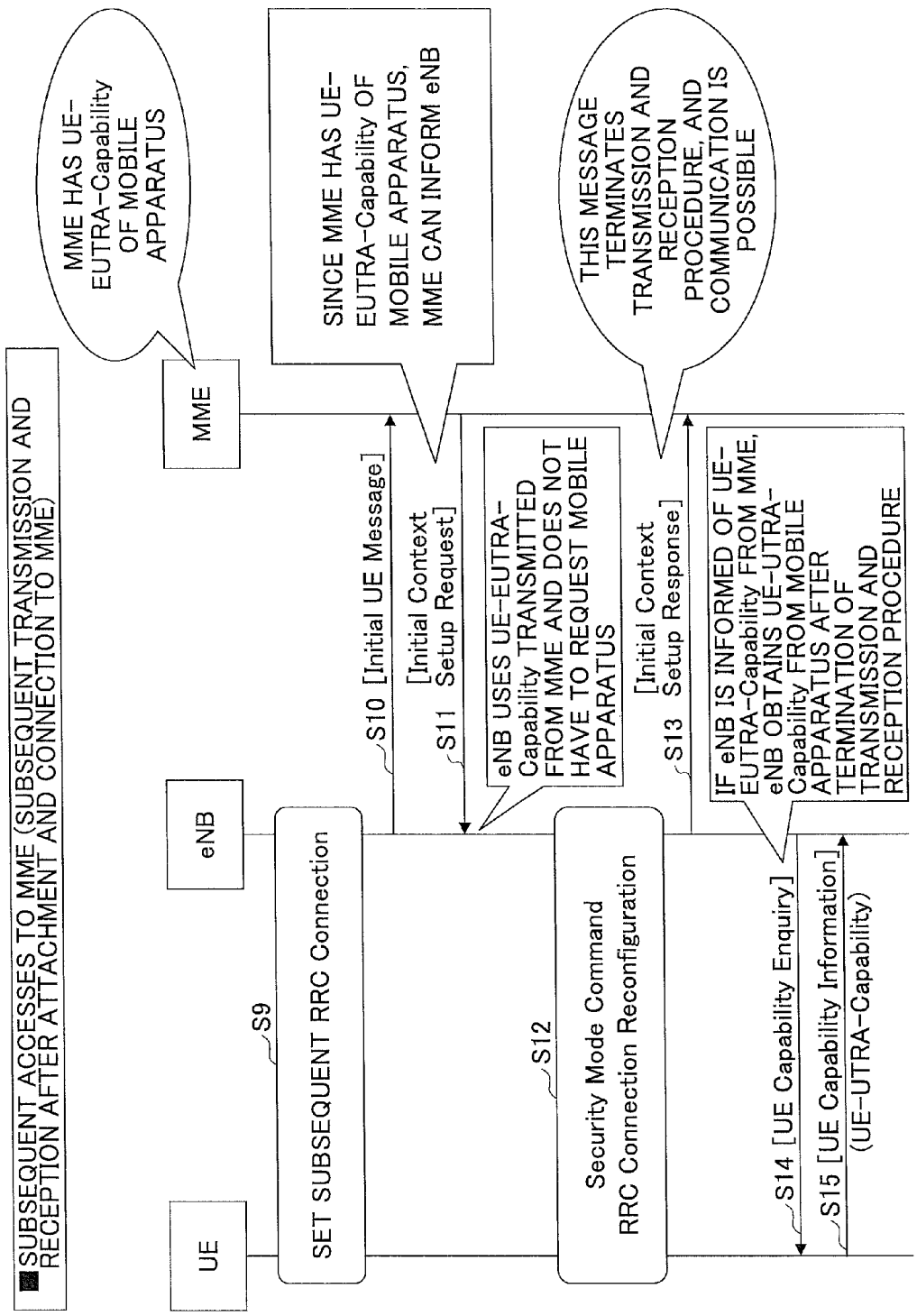
FIG. 5 is a diagram for illustrating an exemplary sequence according to the present embodiment for subsequent accesses to the switching station MME by the mobile apparatus UE.

FIG. 5 illustrates an exemplary sequence according to this embodiment in the case where the mobile apparatus UE subsequently accesses the switching station MME. In this case, the mobile apparatus UE stays in a location registration area managed by the switching station MME.

At step S9, a RRC connection is configured between the mobile apparatus UE and the base station eNB (RRC connection configuration). This is performed when the mobile apparatus UE initiates communication or when the mobile apparatus UE under idle mode receives a paging indicative of incoming calling.

At step S10, the base station eNB sends the switching station MME an "Initial UE Message" as a "line setup request signal". In the illustrated example, the line setup request signal is due to subsequent accesses to the switching station MME by the mobile apparatus UE. Accordingly, the switching station MME already possesses the mobile apparatus capability information for the mobile apparatus UE (UE-EUTRA-capability).

At step S11, the switching station MME sends the base station eNB an "initial Context Setup Request" as a "line setup instruction signal". The switching station MME already possesses the mobile apparatus capability information for the mobile apparatus UE (UE-EUTRA-Capability) and can send the base station eNB the mobile apparatus capability information.

At step S12, ciphering and RRC connection reconfiguration are performed. In this case, the base station eNB may use the mobile apparatus capability information UE-EUTRA-Capability as needed.

At step S13, the base station eNB sends the switching station MME an "Initial Context Setup Response" as a "line setup response signal" or a "line setup completion signal". Subsequently, a user can initiate communication such as voice communication, Internet viewing, information downloading, email transmission and reception and so on.

At step S14, the base station eNB requests the mobile apparatus UE to provide the mobile apparatus capability information in the UTRA based system (UE-UTRA-Capability).

At step S15, the base station eNB receives the mobile apparatus capability information in the UTRA based system (UE-UTRA-Capability) from the mobile apparatus UE and stores the mobile apparatus capability information.

Figure 2:
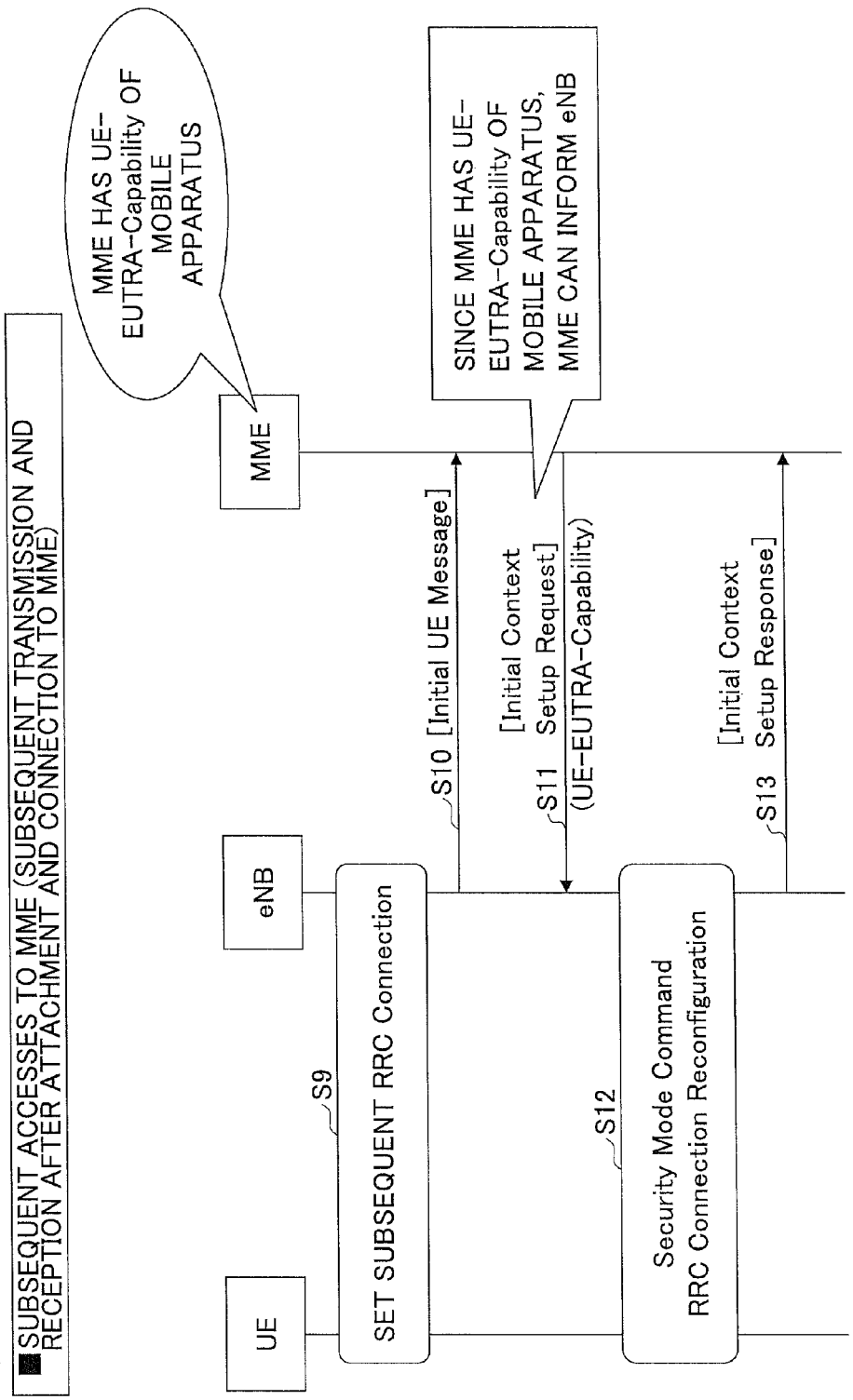
FIG. 2 is a diagram for illustrating an exemplary sequence in an E-UTRA based mobile communication system.
Figure 6:
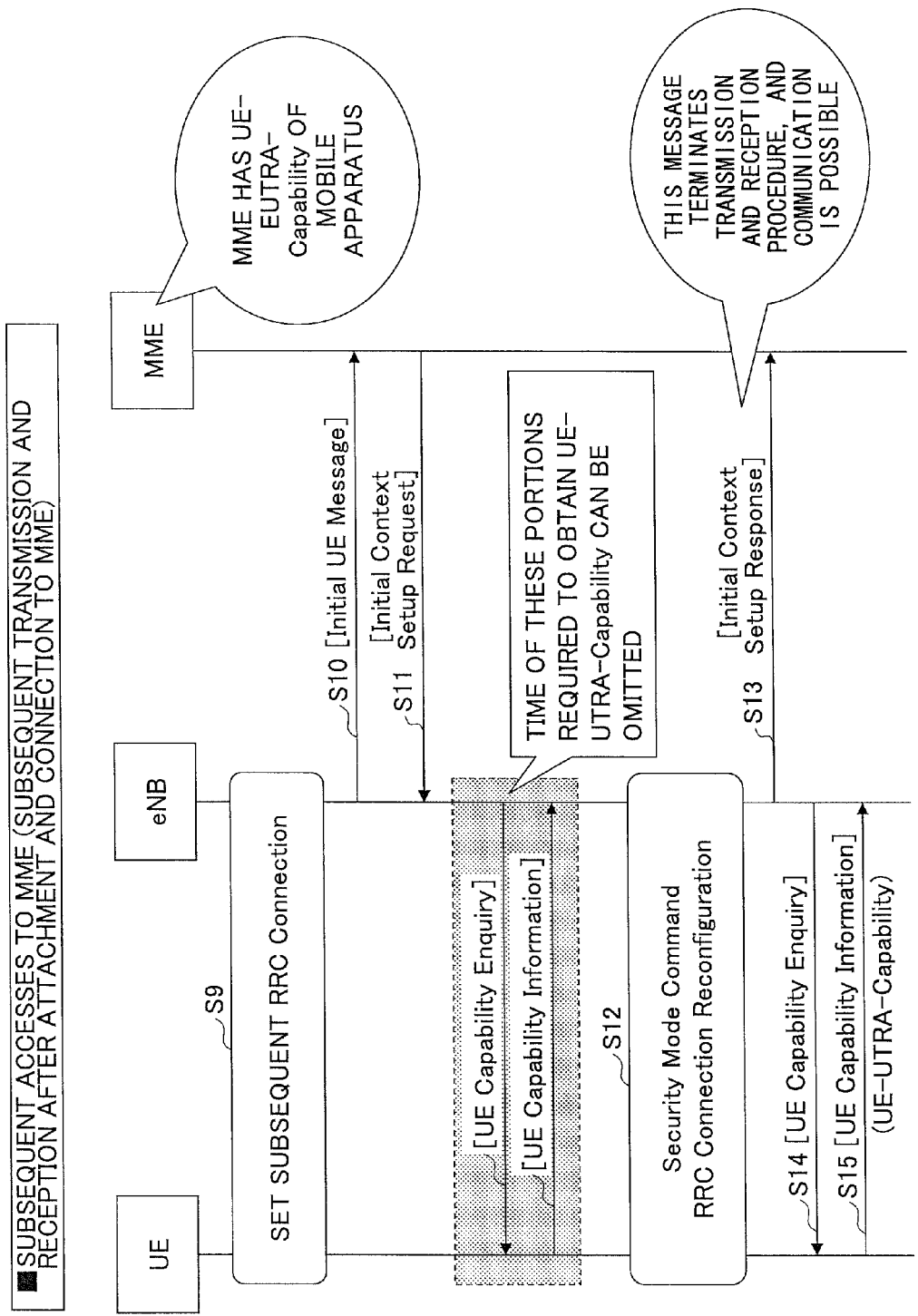
FIG. 6 is a diagram for illustrating an effect of the present embodiment.

In Section "PROBLEM TO BE SOLVED BY THE INVENTION", the acquisition of the mobile apparatus capability information (UE-UTRA-Capability) after the base station eNB has received the "Initial Context Setup Request" in FIGS. 1-2 has been stated as one method for obtaining the mobile apparatus capability information (UE-UTRA-Capability). In this case, instead of steps S14 and S15, the mobile apparatus capability information (UE-UTRA-Capability) would be obtained at the timing as illustrated in dashed lines in FIG. 6. In this case, the acquisition timing of the mobile apparatus capability information is earlier than the timings of steps S14 and S15, but transmission of the line setup response signal at step S13 would be delayed. As a result, the user will experience a longer waiting time. On the other hand, according to this embodiment, the mobile apparatus capability information UE-UTRA-Capability is obtained at steps S14 and S15 after transmission of the line setup response signal at step S13. Since the line setup response signal is transmitted earlier, the user can initiate communication promptly. Also, the communication at steps S14 and S15 is performed in parallel to user's communication after step S13 (voice communication, Internet viewing, information downloading, email transmission and reception and so on), which may prevent the user from experiencing a longer waiting time.

Figure 7:
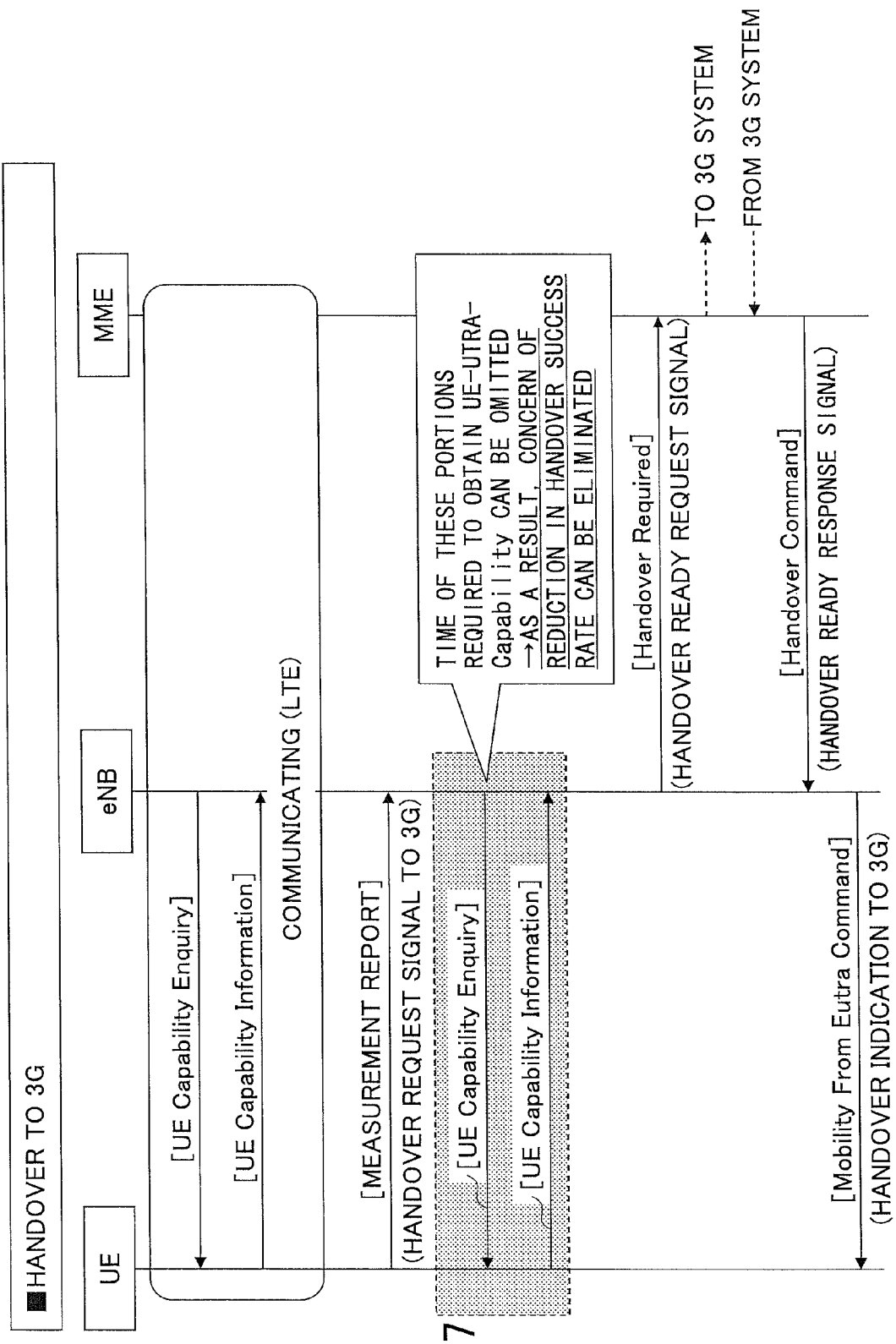
FIG. 7 is a diagram for illustrating an effect of the present embodiment.

Also, in Section "PROBLEM TO BE SOLVED BY THE INVENTION", acquisition of the mobile apparatus capability information (UE-UTRA-Capability) at the timing of determining that the base station eNB (source base station) should perform handover has been stated as another method for obtaining the mobile apparatus capability information (UE-UTRA-Capability). In this case, the base station eNB would obtain the mobile apparatus capability information (UE-UTRA-Capability) at the timing as illustrated in dashed lines in FIG. 7. In this case, a time period from the handover requesting to indication of the handover to the mobile apparatus UE will become longer. According to this embodiment, the mobile apparatus capability information (UE-EUTRA-Capability) has been already obtained at step S5 in FIG. 3 or step S15 in FIG. 5, and it is possible to indicate the mobile apparatus UE to perform handover promptly without necessity of the operations as illustrated in dashed lines in FIG. 7.

Figure 8:
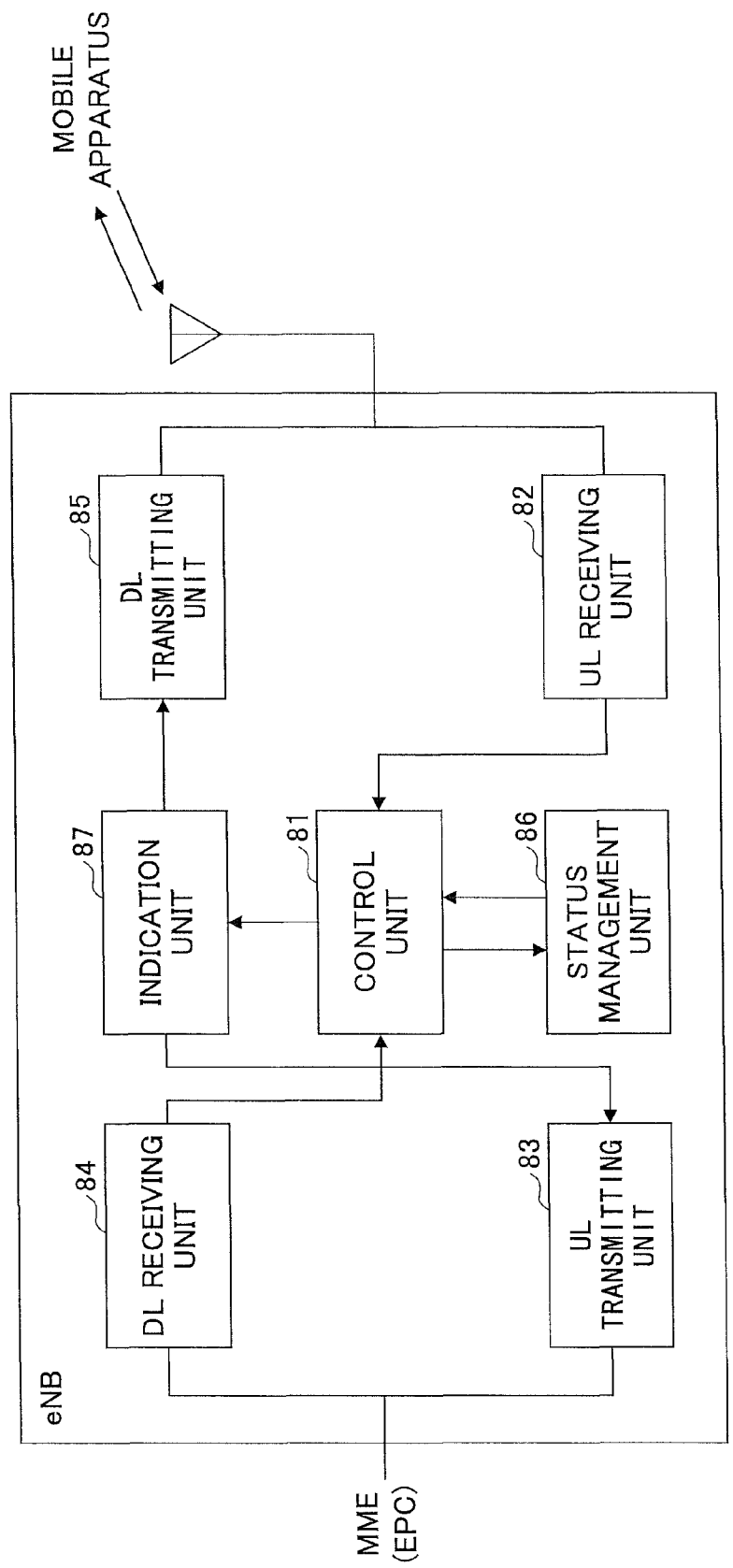
FIG. 8 is a block diagram of a base station according to the present embodiment.

FIG. 8 illustrates a base station eNB available in this embodiment. FIG. 8 schematically illustrates elements particularly related to the present embodiment among various functional elements provided in the base station eNB. As illustrated in FIG. 8, the base station eNB includes a control unit 81, an uplink receiving unit 82, an uplink transmitting unit 83, a downlink receiving unit 84, a downlink transmitting unit 85, a status management unit 86 and an indication unit 87.

The control unit 81 controls operations of various functional elements in the base station eNB.

The uplink (UL) receiving unit 82 receives uplink radio signals transmitted from a mobile apparatus UE. In this embodiment, the uplink receiving unit 82 particularly receives signals associated with a RRC connection and signals including mobile apparatus capability information.

The uplink (UL) transmitting unit 83 sends signals to inform the switching station MME. The signals are transmitted via a S1 interface. In this embodiment, the uplink transmitting unit 83 particularly transmits a line setup request signal (Initial UE Message), mobile apparatus capability information UE-EUTRA-Capability, a line setup response signal (line setup completion signal) (Initial Context Setup Response) and so on.

The downlink (DL) receiving unit 84 receives signals from the switching station MME. The signals are also transmitted via a S1 interface. In this embodiment, the downlink receiving unit 84 particularly receives a line setup instruction signal (Initial Context Setup Request) for reply to the line setup request signal and so on.

The downlink (DL) transmitting unit 85 transmits downlink signals to the mobile apparatus UE over the air. In this embodiment, the downlink transmitting unit 85 particularly transmits signals associated with a RRC connection, a request signal for mobile apparatus capability information (UE Capability Enquiry) and so on.

The status management unit 86 manages the status of a mobile apparatus UE. For example, the status management unit 86 manages and schedules radio resources together with the control unit 81.

The indication unit 87 transmits signals destined for the mobile apparatus UE and/or the switching station MME to the DL transmitting unit 85 and/or the UL transmitting unit 83.

The present invention has been described with reference to specific embodiments, but the embodiments are illustrative, and variations, modifications, alterations and substitutions could be conceived by those skilled in the art. For example, the disclosed invention may be applied to any appropriate mobile communication system for obtaining the mobile apparatus capability information. For example, the disclosed invention may be applied to a HSDPA/HSUPA based W-CDMA system, a WiMAX, a WiFi based system and so on. Specific signal names have been used in the description in order to facilitate understandings of the present invention. However, unless specifically stated otherwise, these specific signal names are illustratively used, and any other appropriate signals may be used. Separation of embodiments or explanation items is not essential to the present invention. Items described in two or more portions may be combined as needed, or an item described in a certain portion may be alternatively or additionally applied to an item described in another portion (if not contradicted). For convenience of explanation, apparatuses according to embodiments of the present invention have been described by means of functional block diagrams, but at least a portion of the apparatuses may be implemented in hardware, software or combinations thereof. The software may be stored in a Random Access Memory (RAM), a flash memory, a Read Only Memory (ROM), an EPROM, an EEPROM, a register, a hard disk (HDD), a removable disk, a CD-ROM, a database, a server and any other appropriate storage medium. The disclosed invention is not limited to the above embodiments, and various variations, modifications, alterations and replacements are encompassed in the present invention without deviating the spirit of the present invention.

This international patent application is based on Japanese Priority Application No. 2010-087104 filed on Apr. 5, 2010, the entire contents of which are hereby incorporated by reference.

LIST OF REFERENCE SYMBOLS

81: control unit
82: uplink receiving unit
83: uplink transmitting unit
84: downlink receiving unit
85: downlink transmitting unit
86: status management unit
87: indication unit

The invention claimed is:
1. A base station comprising:
a radio communication unit configured to wirelessly communicate with a mobile apparatus capable of communicating in both a first mobile communication system and a second mobile communication system; and
a network communication unit configured to communicate with a switching station in the first mobile communication system, wherein if a line setup instruction signal received at the network communication unit from the switching station is not due to initial access to the switching station by the mobile apparatus, the radio communication unit receives mobile apparatus capability information in the second mobile communication system from the mobile apparatus.

2. The base station as claimed in claim 1, wherein if the line setup instruction signal received at the network communication unit from the switching station is due to the initial access to the switching station by the mobile apparatus, the radio communication unit receives the respective mobile apparatus capability information in the first and second mobile communication systems from the mobile apparatus.

3. The base station as claimed in claim 1, wherein the network communication unit sends to the switching station a line setup request signal after configuring a RRC connection between the base station and the mobile apparatus.

4. The base station as claimed in claim 2, wherein the network communication unit sends to the switching station the mobile apparatus capability information in the first mobile communication system.

5. The base station as claimed in claim 1, wherein the mobile apparatus capability information in the second mobile communication system includes at least information on processing capability of the mobile apparatus, information on a band available to the mobile apparatus for communication and security information.

6. The base station as claimed in claim 1, wherein the first mobile communication system is an E-UTRA based mobile communication system, and the second mobile communication system is a UTRA based mobile communication system.

7. A method in a base station including a radio communication unit configured to wirelessly communicate with a mobile apparatus capable of communicating in both a first mobile communication system and a second mobile communication system and a network communication unit configured to communicate with a switching station in the first mobile communication system, comprising:
receiving mobile apparatus capability information, by the radio communication unit, in the second mobile communication system from the mobile apparatus if a line setup instruction signal received at the network communication unit from the switching station is not due to initial access to the switching station by the mobile apparatus.

8. The method as claimed in claim 7, further comprising, if the line setup instruction signal received at the network communication unit from the switching station is due to the initial access to the switching station by the mobile apparatus, the radio communication unit receiving the respective mobile apparatus capability information in the first and second mobile communication systems from the mobile apparatus.

9. The method as claimed in claim 7, further comprising the network communication unit sending to the switching station a line setup request signal after configuring a RRC connection between the base station and the mobile apparatus.

10. The method as claimed in claim 8, further comprising the network communication unit sending to the switching station the mobile apparatus capability information in the first mobile communication system.

11. The method as claimed in claim 7, wherein the mobile apparatus capability information in the second mobile communication system includes at least information on processing capability of the mobile apparatus, information on a band available to the mobile apparatus for communication and security information.

12. The method as claimed in claim 7, wherein the first mobile communication system is an E-UTRA based mobile communication system, and the second mobile communication system is a UTRA based mobile communication system.

* * * * *